(12) United States Patent
Müllner et al.

(10) Patent No.: US 6,580,763 B1
(45) Date of Patent: Jun. 17, 2003

(54) METHOD AND APPARATUS FOR CONTROLLING THE DECISION THRESHOLD AND SAMPLING INSTANT OF A DATA GENERATOR

(75) Inventors: Ernst Müllner, München (DE); Stefan Hofschen, Münsing (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/403,664
(22) PCT Filed: Mar. 27, 1998
(86) PCT No.: PCT/DE98/00893
§ 371 (c)(1), (2), (4) Date: Oct. 25, 1999
(87) PCT Pub. No.: WO98/49811
PCT Pub. Date: Nov. 5, 1998

(30) Foreign Application Priority Data

Apr. 25, 1997 (DE) .......................................... 197 17 643

(51) Int. Cl.[7] .......................... H04L 27/06; H04L 27/14; H04L 27/22; H03K 9/00
(52) U.S. Cl. ........................................ 375/316; 375/376
(58) Field of Search ................................ 375/316, 376, 375/4

(56) References Cited

U.S. PATENT DOCUMENTS 4,823,360 A * 4/1989 Tremblay et al. ........... 327/165

FOREIGN PATENT DOCUMENTS

| DE | 31 22763 C2 | 12/1982 |
| EP | 0 328 266 | 8/1989 |
| EP | 0 455 910 A2 | 11/1991 |
| EP | 0 716 523 A1 | 6/1996 |
| EP | 0 744 848 A1 | 11/1996 |

OTHER PUBLICATIONS

A 20 Gbit/s parallel phase detector and demultiplexer circuit in a production silicon bipolar technology with F=25 Ghz, Mullner et al., pp. 43–45.

A Self Correcting Clock Recovery Circuit, Hogge, pp. 1312–1314.

* cited by examiner

Primary Examiner—Stephen Chin
Assistant Examiner—Curtis Odon
(74) Attorney, Agent, or Firm—Bell, Boyd & Lloyd, LLC

(57) ABSTRACT

A method and apparatus for controlling the decision threshold and the sampling instant of a data regenerator wherein the data regenerator includes a second data path whose decision threshold can be shifted. By comparing the output data, it is possible to calculate the bit errors which are caused by a shifting of the decision threshold. By experimentally shifting the sampling instant and subsequently the decision threshold the optimal sampling instant and the optimal decision threshold are found.

10 Claims, 1 Drawing Sheet

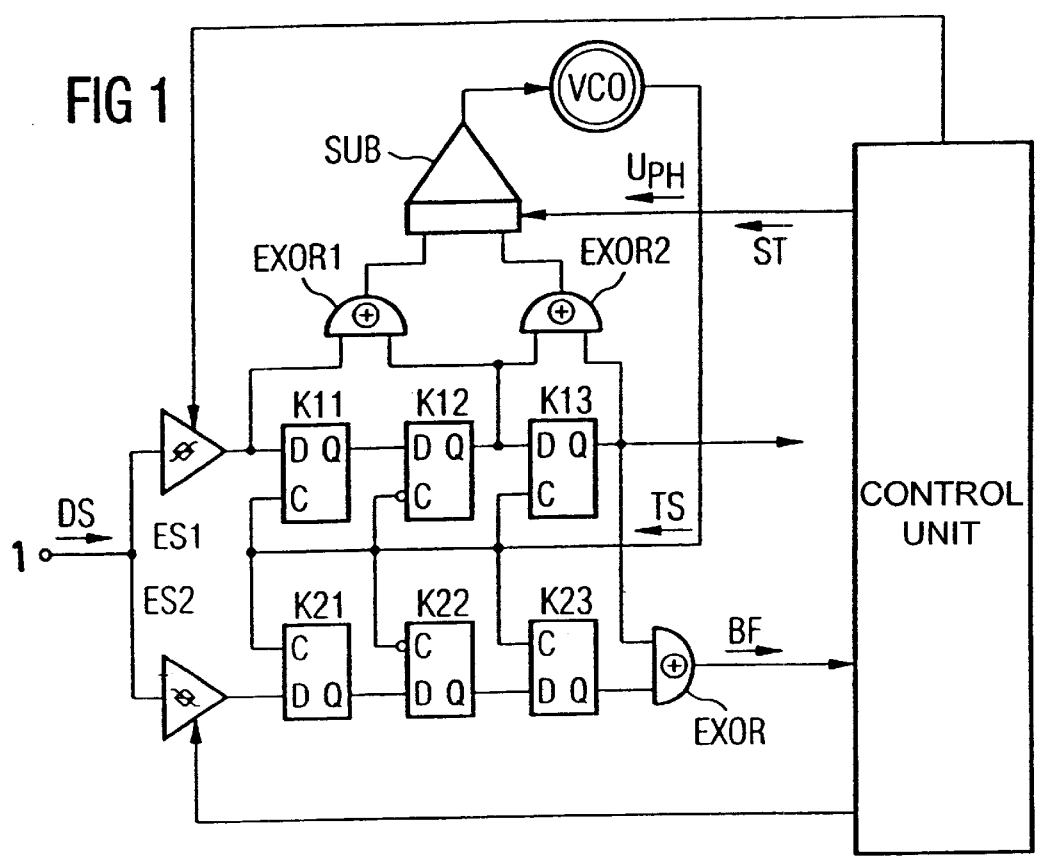
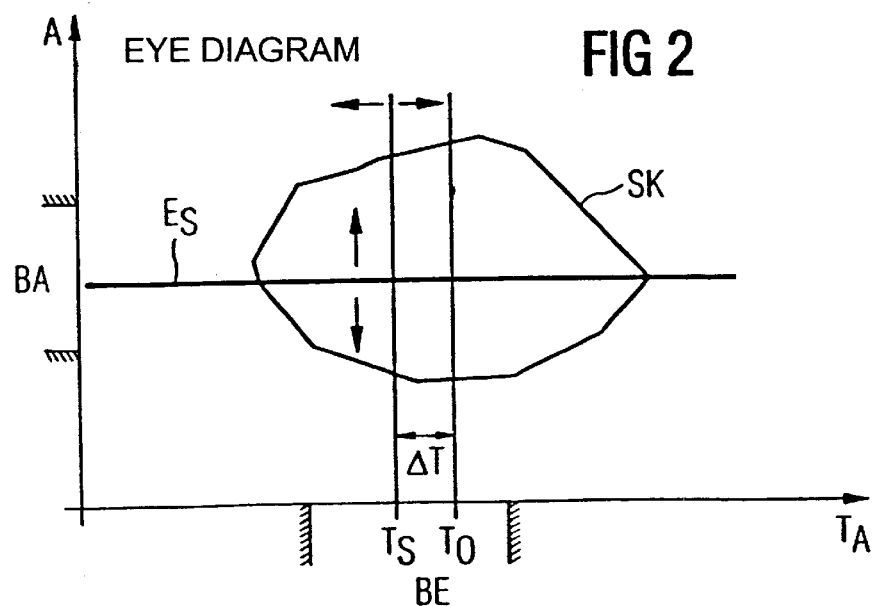

METHOD AND APPARATUS FOR CONTROLLING THE DECISION THRESHOLD AND SAMPLING INSTANT OF A DATA GENERATOR

BACKGROUND OF THE INVENTION

1. Field of the Invention

The present invention relates to a method and apparatus for controlling the decision threshold and sampling instant of a data regenerator wherein a second data path is provided whose decision threshold can be shifted such that, by experimentally shifting both the sampling instant and the decision threshold, optimal values of each may be found.

2. Description of the Prior Art

A phase detector that delivers a control signal for a controllable oscillator is taught in IEEE, Journal of Lightwave Technology, Volume Lt-3, No. 6, pp. 1312–1314. For extremely high frequencies over 10 gigahertz, level-controlled memory stages are used for purposes of building the phase detector. A phase detector of this type is described in thee European patent application EP 716 523 A1. In order to guarantee optimal sampling and low bit error rates, both the decision threshold for the receive signal and. the sampling instant must be set.

Due to the unavoidable changes of the transmitter, transmission paths and receiver, a one-time adjustment is insufficient. One solution is to vary the sampling instant while simultaneously measuring the occurring bit error rate. The correct sampling instant is set when the bit error rate reaches its minimum. The optimal decision threshold can be set accordingly. This method, however, would have the disadvantage that higher bit error rates would occur due to the shifting of the sampling instant and the decision threshold. At least during operation, such a method could not be applied.

The application E 0 328 266 A3 teaches a data regenerator with three data paths which respectively include different threshold values, the middle threshold value being determined by the others. The data regenerator allows for optimization both of the sampling thresholds and the sampling instant. Here however, a change of the decision threshold in the working data path occurs given a change of the other decision thresholds. It is thus an object of the present invention to propose a method and apparatus for optimally adjusting the decision threshold and the sampling instant, where in the method also can be executed during the transmission of data.

SUMMARY OF THE INVENTION

Accordingly, in accordance with an embodiment of the present invention, a method is provided for adjusting a decision threshold and a sampling instant of a data regenerator having at least first and second data paths, wherein the method includes the steps of: providing each of the first and second data paths with a decision unit having an adjustable decision threshold; providing a comparison circuit for comparing output data of the first and second data paths; feeding a data signal to the first data path; recovering the data signal in the first data path and generating a sampling clock signal by a phase control unit; feeding the data signal to the decision unit of the second data path; comparing the output data of the first data path with the output data of the second data path; increasing and decreasing the decision threshold in the second data path until a same predetermined limit bit error rate respectively occurs at limit threshold values; setting a mean value of the measured limit threshold values as a new decision threshold in both the first and second data paths; experimentally shifting the sampling instant by a predetermined amount in one direction; increasing and decreasing the decision threshold of the second data path until the same predetermined limit bit error rate occurs again; checking whether a differential between the upper and lower decision thresholds is larger or smaller than prior to the experimental shifting of the sampling instant; setting a new sampling instant and a newly calculated decision threshold if the differential is larger; and experimentally shifting the sampling instant in the opposite direction if the differential is smaller.

In an embodiment, the method further includes the steps of: initially experimentally shifting the sampling instant a fixed amount in one direction; increasing and decreasing the decision threshold in the second data path until the same predetermined limit bit error rate occurs; shifting the sampling instant by the same amount in the opposite direction; increasing and decreasing the decision threshold of the second data path until the same predetermined limit bit error rate occurs again; and calculating and setting by interpolation the optimal sampling instant with the aid of the adjusted decision thresholds.

In an embodiment of the method, the shifting of the sampling instant respectively occurs only by an amount of a predetermined correction step.

In an embodiment of the method, the shifting of the data threshold respectively occurs only by an amount of a predetermined correction value.

In an embodiment, the method, the experimental shifting of the decision threshold is performed multiple times in succession if the newly calculated mean value is greater than a correction step.

In an embodiment of the method, corrections of both the sampling instant and the decision threshold occur in alternation.

In an embodiment of the method, the limit bit error rate is modified during an adjusting process.

In an embodiment of the method, the magnitude of the experimental shift of the sampling instant is modified during an adjusting process.

In a further embodiment of the present invention, an apparatus is provided for controlling a decision threshold and a sampling instant of a data regenerator, wherein the apparatus comprising: a first data path having a first decision unit; at least one second data path having a second decision unit whose decision threshold is independently adjustable; a comparison circuit for comparing respective output data from both the first and second data paths; a phase control loop for generating a sampling clock signal; and a control unit for adjusting the respective decision thresholds of the first and second decision units and the sampling instant, wherein the control unit deliberately shifts the sampling instant and the decision threshold in order to determine an optimal sampling instant and an optimal decision threshold from the subsequently measured limit bit error rate.

In an embodiment, the apparatus further includes at least one of an adder and a subtractor, as means for shifting the sampling phase, whose output voltage controls an oscillator.

The utilization of a second data path and two decision thresholds that can be adjusted independent of one another makes the method particularly advantageous, since, in the additional data path, it is possible to adjust the decision threshold until errors occur conditioned by the poor sampling, for purposes of finding the optimum, without this affecting the data which are to be further processed.

But it is advantageous that the sampling instant for both data paths is jointly controlled. As a result, the outlay is significantly lower, and it is ensured that the optimal sampling occurs automatically in the useful data path as well.

Additional features and advantages of the present invention are described in, and will be apparent from, the Detailed Description of the Preferred Embodiments and the Drawing.

DESCRIPTION OF THE DRAWING

FIG. 1 shows a schematic diagram of the apparatus of the present invention; and

FIG. 2 shows a decision threshold v, sampling instant curve associated with the method of the present invention.

DETAILED DESCRIPTION OF THE PREFERRED EMBODIMENTS

The arrangement illustrated in FIG. 1 depicts a first data path with a decision unit ES1 and three storage cells K11, K12, and K13, which form a first data path and whose output signals are connected to the inputs of two exclusive-or gates EXOR1 and EXOR2 for purposes of acquiring a control signal and a reference signal. The outputs of these are connected via a subtracter SUB, the output signal of which controls an oscillator VCO. The type of phase detector and phase control loop is not essential to the invention. Details (such as a filter) were not included in the illustration for the sake of surveyability.

The oscillator generates a clock signal TS, which triggers both the memory stages of the first data path and the memory stages K21, K22 and K23 of the second data path. The second data path contains a second decision unit ES2. The inputs of the two decision units are combined into one data input 4, to which the received data signal DS1 is fed, for instance subsequent to the conversion of an optical signal into an electrical signal. The outputs of both data paths are combined via an additional exclusive-or gate EXOR, the output of which is connected to a data input of a control unit ST. This can modify the decision thresholds of both decision units ES1 and ES2 and can vary the sampling instant, in this exemplifying embodiment by adding a regulating voltage $U_{PH}$ to the acquired control voltage. It would also be possible to use a It is assumed that both decision thresholds are initially set to a standard value $E_s$, and that the sampling instant $T_A$, which repeats with the data cycling rate, is likewise set to a standard value $T_{sd}$ (FIG. 2). First, the decision threshold (amplitude A) of the second decision unit ES2 is experimentally modified i for instance, increased. Bit errors BF occur at the output of the additional exclusive-or gate EXOR, which compares the output signals of the two data paths. The decision threshold is further increased until a predetermined limit value of the error rate is reached, which is depicted in FIG. 2 as limit bit error rate curve SK. Once the limit error rate curve is reached, a modification of the decision threshold in the opposite direction is performed, (here a decreasing of the decision threshold,) until the same limit error rate, or, the limit error rate curve SK, is reached. The mean of the upper and lower limit thresholds yields the new desired position of the decision threshold, which also is set for the decision unit of the first data path. It also is possible to respectively modify the decision threshold by only a previously determined maximal amount.

Subsequent to the correcting of the decision threshold, the sampling instant $T_s$ is experimentally shifted in an arbitrary direction by a time differential $\Delta T$ at which no, or few errors occur. A modification of the decision threshold in both directions then occurs, until the respective limit bit error rate is reached. If the differential of the appertaining limit threshold values is greater than the preceding differential, then the shift in the correct direction occurs, and the new sampling instant $T_o$ (already the optimal sampling instant here) remains temporarily set as desired instant. For this sampling instant, the decision threshold of the first decision unit also also be immediately corrected.

On the other hand, if the differential between the upper and lower limit threshold values has decreased, then the standard sampling instant or, respectively, the preceding sampling instant, was the better one. Based on this, the sampling instant is then shifted in the opposite direction in order to adjust the second decision threshold again in both directions, until reaching the predetermined limit bit error rates. The processes are then repeated until the optimum is reached.

Another possibility is to shift the sampling instant first in one direction and then in the other, potentially several times (if this is possible based on the diagram) and, after each shift, to shift the second decision threshold in both directions up to the limit error rate. Such is done in order to calculate an optimal sampling instant $T_o$ and an optimal sampling threshold; that is, the minimum of the bit error rate.

These shifts of the sampling instant and decision threshold can be limited to a maximal value and can occur only within definite ranges BE for the sampling instant and BA for the decision threshold, in order keep the clock regenerator operative. By contrast, the experimental shifting of the second decision threshold always occurs up to the limit bit error rate curve.

The correcting of the sampling instant and decision threshold can be performed continuously. The magnitude of the experimental modifications can be varied. For example, given a new data connection, a greater shift [sic] of the sampling instant initially can occur. Also, the limit error rate for shifting the decision threshold can be increased. This would ensure that the absolute minimum is reached with certainty. In the steady state, the shifting of the sampling instant can turn out to be smaller, and smaller limit error rates can be provided, in order to achieve a more precise adjustment. The shifting of the decision threshold and sampling clock can occur in alternation.

Although the present invention has been described with reference to specific embodiments, those of skill in the art will recognize that changes may be made thereto without departing from the spirit and scope of the invention as set forth in the hereafter appended claims.

We claim:

1. A method for adjusting a decision threshold and a sampling instant of a data regenerator having at least first and second data paths, the method comprising the steps of:

providing each of the first and second data paths with a decision unit having an adjustable decision threshold;

providing a comparison circuit for comparing output data of the first and second data paths;

feeding a data signal to the first data path;

recovering the data signal in the first data path and generating a sampling clock signal by a phase control unit;

feeding the data signal to the decision unit of the second data path;

comparing the output data of the first data path with the output data of the second data path;

increasing and decreasing the decision threshold in the second data path until a same predetermined limit bit error rate respectively occurs at limit threshold values;

setting a mean value of the measured limit threshold values as a new decision threshold in both the first and second data paths;

experimentally shifting the sampling instant by a predetermined amount in one direction;

increasing and decreasing the decision threshold of the second data path until the same predetermined limit bit error rate occurs again;

checking whether a differential between the upper and lower decision thresholds is larger or smaller than prior to the experimental shifting of the sampling instant;

setting a new sampling instant and a newly calculated decision threshold if the differential is larger; and experimentally shifting the sampling instant in the opposite direction if the differential is smaller.

2. A method for adjusting a decision threshold and a sampling instant of a data regenerator having at least first and second data paths as claimed in claim 1, further comprising the steps of:

initially experimentally shifting the sampling instant a fixed amount in one direction;

increasing and decreasing the decision threshold in the second data path until the same predetermined limit bit error rate occurs;

shifting the sampling instant by the same amount in the opposite direction;

increasing and decreasing the decision threshold of the second data path until the same predetermined limit bit error rate occurs again; and calculating and setting by interpolation the optimal sampling instant with the aid of the adjusted decision thresholds.

3. A method for adjusting a decision threshold and a sampling instant of a data regenerator having at least first and second data paths as claimed in claim 2, wherein the shifting of the sampling instant respectively occurs only by an amount of a predetermined correction step.

4. A method for adjusting a decision threshold and a sampling instant of a data regenerator having at least first and second data paths as claimed in claim 3, wherein the shifting of the data threshold respectively occurs only by an amount of a predetermined correction value.

5. A method for adjusting a decision threshold and a sampling instant of a data regenerator having at least first and second data paths as claimed in claim 4, wherein the experimental shifting of the decision threshold is performed multiple times in succession if the newly calculated mean value is greater than a correction step.

6. A method for adjusting a decision threshold and a sampling instant of a data regenerator having at least first and second data paths as claimed in claim 1, wherein corrections of both the sampling instant and the decision threshold occur in alternation.

7. A method for adjusting a decision threshold and a sampling instant of a data regenerator having at least first and second data paths as claimed in claim 1, wherein the limit bit error rate is modified during an adjusting process.

8. A method for adjusting a decision threshold and a sampling instant of a data regenerator having at least first and second data paths as claimed in claim 1, wherein the magnitude of the experimental shift of the sampling instant is modified during an adjusting process.

9. An apparatus for controlling a decision threshold and a sampling instant of a data regenerator, the apparatus comprising:

a first data path having a first decision unit;

at least one second data path having a second decision unit whose decision threshold is independently adjustable;

a comparison circuit for comparing respective output data from both the first and second data paths;

a phase control loop for generating a sampling clock signal; and a control unit for adjusting the respective decision thresholds of the first and second decision units and the sampling instant, wherein the control unit deliberately shifts the sampling instant and the decision threshold in order to determine an optimal sampling instant and an optimal decision threshold from the subsequently measured limit bit error rate.

10. An apparatus for controlling a decision threshold and a sampling instant of a data regenerator as claimed in claim 9, further comprising:

means for shifting the sampling phase, whose output voltage controls an oscillator.

* * * * *